(12) United States Patent
Ducrot et al.

(10) Patent No.: US 10,792,871 B2
(45) Date of Patent: Oct. 6, 2020

(54) MOULDING

(71) Applicant: Hexcel Reinforcements SAS, Dagneux (FR)

(72) Inventors: Mayeul Ducrot, Dagneux (FR);
Laurent Barnier, Dagneux (FR);
Pascal Poulleau, Dagneux (FR)

(73) Assignee: HEXCEL COMPOSITES SAS, Dagneaux (FR)

( * ) Notice: Subject to any disclaimer, the term of this patent is extended or adjusted under 35 U.S.C. 154(b) by 250 days.

(21) Appl. No.: 15/749,315

(22) PCT Filed: Aug. 4, 2016

(86) PCT No.: PCT/EP2016/068647
§ 371 (c)(1),
(2) Date: Jan. 31, 2018

(87) PCT Pub. No.: WO2017/029121
PCT Pub. Date: Feb. 23, 2017

(65) Prior Publication Data
US 2018/0222131 A1    Aug. 9, 2018

(30) Foreign Application Priority Data

Aug. 18, 2015   (EP) .................................. 15181486

(51) Int. Cl.
| | | |
|---|---|---|
| *B29C 70/46* | (2006.01) | |
| *B29C 33/44* | (2006.01) | |
| *B29C 70/12* | (2006.01) | |
| *B29C 33/30* | (2006.01) | |
| *B29K 63/00* | (2006.01) | |
| *B29K 79/00* | (2006.01) | |
| *B29K 105/08* | (2006.01) | |
| *B29K 105/10* | (2006.01) | |
| *B29K 105/26* | (2006.01) | |
| *B29K 277/00* | (2006.01) | |
| *B29K 307/04* | (2006.01) | |

(Continued)

(52) U.S. Cl.
CPC .......... *B29C 70/462* (2013.01); *B29C 33/306* (2013.01); *B29C 33/44* (2013.01); *B29C 70/12* (2013.01); *B29K 2063/00* (2013.01); *B29K 2079/08* (2013.01); *B29K 2105/0872* (2013.01); *B29K 2105/105* (2013.01); *B29K 2105/26* (2013.01); *B29K 2277/00* (2013.01); *B29K 2307/04* (2013.01); *B29K 2309/08* (2013.01); *B29L 2031/3076* (2013.01)

(58) Field of Classification Search
CPC .................................................... B29C 70/462
See application file for complete search history.

(56) References Cited

U.S. PATENT DOCUMENTS

| | | |
|---|---|---|
| 5,356,692 A | 10/1994 | Perez |
| 2002/0190439 A1 | 12/2002 | Nelson et al. |
| 2010/0108812 A1 | 5/2010 | Boursier |

FOREIGN PATENT DOCUMENTS

| | | |
|---|---|---|
| WO | 2006/118442 | 11/2006 |
| WO | 2010/092081 | 8/2010 |
| WO | 2014/198263 | 12/2014 |

*Primary Examiner* — Larry W Thrower
(74) *Attorney, Agent, or Firm* — W. Mark Bielawski

(57) ABSTRACT

A mould for the production of articles comprising a cavity for the retention of a fibrous material impregnated with a curable resin defined by a top, a base (1) and side walls (4, 5, 6, 7) and an internal insert (2) having sectional walls that can move independently of each other in order to exert pressure on the fibrous material.

2 Claims, 2 Drawing Sheets

(51) Int. Cl.
*B29K 309/08* (2006.01)
*B29L 31/30* (2006.01)

MOULDING

The present invention relates to improvements in or relating to moulding and in particular to compression moulding of articles and to moulds for use therein. More particularly the invention is concerned with the compression moulding and curing of resin impregnated fibrous materials to produce articles especially articles with sharp corners such as frames and/or hollow articles.

Hollow articles are produced from resin impregnated fibrous materials by bladder injection moulding in which a resin impregnated fibrous material is provided on the surface of an inflatable bladder located within a mould. The bladder may then be inflated to provide the pressure to bring the resin impregnated fibrous material into conformity with the surface of the mould where it is heated to cure the resin to produce the article from the resin impregnated fibrous material. The bladder may then be deflated and removed from within the cured structure to leave the hollow article derived from the resin impregnated fibrous material.

Such a process is described in United States Patent Application publication 2002/0190439 in relation to the manufacture of golf club heads. However, such a process is not suitable for the manufacture of hollow articles which have sharp corners such as frames because the inflation of the bladder is unable to direct the resin impregnated fibrous material into sharp corners defined by the mould and then locate and retain the material under sufficient pressure within the corners during the cure cycle. Additionally it is necessary to provide means whereby the bladder can be deflated and removed from the moulding once moulding is completed. Furthermore some applications such as the production of aerospace components require high pressures during moulding which are difficult to achieve using an inflatable bladder.

It has also been proposed that the pieces which define a sharp corner may be moulded separately and later joined together. This however is a time consuming process and does not produce an article having uniform properties (such as tensile strength) around the entire perimeter of the article. In particular the article will contain join lines at the corners which may provide locations of weakness and may also be unsightly.

The invention therefore provides a mould and a moulding process that overcomes these difficulties and/or which provides improvement generally.

According to the invention there is provided a mould, a process, and a component as defined in any one of the accompanying claims.

The invention provides a mould for the production of articles comprising a cavity for the retention of a fibrous material impregnated with a curable resin defined by a top, a base and side walls and an internal insert wherein the outer walls of the insert are in sections that can move independently of each other towards and away from the insert in order to change the dimensions of the insert to thereby exert pressure on the fibrous material, and the mould is further provided with means to cure the resin.

The insert is surrounded by an elastomeric surround or cover, such as a flexible envelope, which conforms to the dimensional changes of the insert. This prevents surface imperfections and results in a smooth surface on the inside of the moulded article. Preferably the surround or cover is self releasing to thermocurable resin and/or the surround or cover acts as a barrier preventing ingress of resin into the internal insert. The elastomeric surround or cover may comprise silicon rubber of all shore grade from 1 to 64 shore or more, synthetic rubber (example VITON). The insert can be made from metal but other type of material can be used as Teflon/PTFE.

The insert is operate by a punch which engages with the insert sectional walls to move them. The sectional walls of the insert may be of circular shape and/or curved and continuous shapes.

The invention further provides a process for the moulding and curing of fibrous material embedded in a matrix of a thermocurable resin comprising locating an insert within a mould having a top, a base and side walls that are in sections that can move independently of each other, providing a layer of fibrous material embedded in a matrix of thermocurable resin between the insert and the outer walls of the cavity, placing the top of the mould in position and moving the sections of the side walls independently to compress the layer of fibrous material between each section of the side walls and the insert and heating to cure the thermocurable resin while compressed between the side walls of the cavity and the insert.

The moulds and process invention are particularly suited for the production of mouldings with corners, particularly with sharp corners such as those having 1 to 90 degrees, preferably 1 to 60 degrees and more preferably from 20 to 40 degrees between adjacent segments of the moulding. Furthermore the invention is also particularly suitable for the production of hollow articles.

In a preferred embodiment the sectional insert walls are tapered to provide a wedge shape so that the walls either individually or multiple wedge sections thereof can be moved inwards as they engage with the punch to compress and mould the fibrous material embedded in the matrix of thermocurable resin against the insert in a manner that provides a continuous peripheral moulding surface. This enables the fibrous material embedded in the thermocurable resin to be continuously compressed around the insert and for the resin to be cured when it is in this compressed state. The top of the mould is moveable to allow insertion of the inlet and the fibrous material and acts as a press which can be pressed downwardly to exert vertical downward pressure during moulding.

The dimensions and shape of the mould will be chosen according to the shape of the article that is to be produced. For example, if the article to be produced is a rectangular frame the insert will be rectangular and the side walls of the mould will preferably comprise four wedge shaped sections one for each side of the frame. Similarly if the article is to be triangular the insert will be triangular in shape the side walls of the mould will comprise three wedge shaped sections. Similar designs can be employed for the production of multisided hollow mouldings. The lengths of the various sides of the mould may be the same or different. The wedge shape engages with the surfaces of a punch to exert pressure on the sectional insert walls thereby expanding the insert.

The moulds of this invention are typically made of metal such as hardened steel and are provided with timed heating means to effect the curing cycle of the resin.

In a preferred moulding technique according to the invention the distance between the top and the base of the mould is locked which ensures that the sidewise pressure that is exerted by the inward movement of the insert side wall components is directed upon the moulding material. The insert walls are then moved inwards exerting pressures of from 80 to 120 bar on the moulding material. The pressure should be sufficient to ensure that the resin impregnated fibrous material is driven into the entire mould cavity including into the corners between the side walls of the mould. Once the desired pressure and thus the required distribution has been achieved the resin is cured typically isothermally. Typical, but non-limiting, curing temperatures are from 160° C. to 200° C. particularly 175° C. for 185° C. when producing heat resistant aerospace components. This technique has been found to produce excellent mouldings including those with sharp corners.

The invention may be used for the moulding of any materials comprising fibrous materials embedded in a curable resin. The invention is particularly useful for the production of articles from moulding compounds such as sheet moulding compounds or from prepregs or semipregs. The material may be processed into a preform before introduction into the mould or it may be provided as a layer (which may comprise one or more layers) around the insert in the mould. When moulding compounds are used it is preferred to first create a preform of the article which is then inserted into the mould.

Where the invention is used in the curing of preforms based on the fibre reinforced resinous material a preform of the hollow article may be prepared from the fibrous material within a matrix of the uncured or partially cured resin. An insert may then be provided within the preform shaped to allow the preform to be moulded between the expandable insert and a mould cavity. The preform and the insert may be inserted into the cavity of a mould of this invention whereby the expansion of the insert is controlled by contact of a punch with movable sectional elements of the insert. The mould may then be heated or the mould is held at the cure temperature, to cure the resin and produce the finished article. The side walls of the mould may then be moved back to their original position to enable the moulded article to be removed from the mould. The insert may then be reused to produce subsequent mouldings.

One moulding compound that can be moulded according to the present invention comprises randomly oriented segments of unidirectional tape that are impregnated with resin. These are sometimes referred to as quasi-isotropic chopped material or prepreg. Quasi-isotropic chopped prepreg is a form of random discontinuous fibre composite (DFC) that is available commercially from Hexcel Corporation (Dublin, Calif.) under the trade name HexMC® and HexMC®-i. HexMC® is particularly useful for producing aerospace articles.

Quasi-isotropic (Q-I) material or prepreg is composed of segments or "chips" of unidirectional fibre, such as tape, and a resin matrix. Q-I material is typically supplied as a mat made up of randomly oriented chips of chopped unidirectional tape prepreg, but may also be at least partially derived from semipreg, towpreg, tape or mixtures thereof. The Q-I material may also be at least partially derived from recycled materials, such as selvedges of tapes. The size of the chips may be varied as well as the type of fibres depending upon the size and shape of the pre-form as well as how precisely the pre-form must be machined to meet dimensional tolerances, if any. It is preferred that, the chips be ⅓ inch wide, 2 inches long and 0.006 inch thick, The chips include unidirectional fibres that can be carbon, glass, aramid, polyethylene or any of the fibres types that are commonly used in the aerospace industry. Carbon fibres are preferred. The chips are randomly oriented in the mat and they lay relatively flat. This provides the mat with its transverse isotropic properties.

The tape containing unidirectional fibres that is chopped to form the chips or segments includes a resin matrix that can be any of the resins that are commonly used in prepregs. Bismaleimide resins and thermosetting epoxy resins, are examples of suitable resins. Bismaleimide resins are particularly useful in the production of aerospace components that are required to withstand high temperatures. Epoxy resins that are toughened with thermoplastics are also preferred because they tend to be more resistant to fracturing or delamination if machining of the final composite part is required. The resin content of the chips may be varied between 25 and 45 wt % of the total prepreg weight. Chips with resin contents of between 35 and 40 wt % are preferred. No additional resin is typically added to the prepreg chips when forming the quasi-isotropic chopped prepreg. The resin present in the initial UD tape prepreg is sufficient to bond the chips together to form a mat. When mouldings are made from these materials according to this invention it is preferred to first make a preform of the article which is then moulded according to this invention.

The quasi-isotropic (Q-I) chopped material or prepreg can be made from unidirectional prepreg tape or tow of desired width. The tape or tow is chopped into chips of desired length and the chips are laid randomly in layers to form the solid portions of the preform or laid randomly in uniform layers around a mandrel. The randomly placed UD prepreg chips are pressed together to form the pre-form. The preform may be composed entirely of Q-I prepreg chips when a mandrel is present in the pre-form. Alternatively, the randomly oriented UD prepreg chips may be used to form only a portion of the pre-form with the other portion being composed of UD prepreg and/or other fibre orientations. When pressed together, the individual randomly oriented UD prepreg chips inherently bond together due to the presence of the prepreg resin.

An exemplary preferred quasi-isotropic chopped prepreg material is HexMC® 8552/AS4, This quasi-isotropic chopped prepreg material is supplied as a continuous roll of a mat that is 46 cm wide and 0.20 cm thick. HexPly® 8552/AS4 unidirectional fibre prepreg is used to make the chips that are randomly oriented in the quasi-isotropic mat. HexPly® 8552/AS4 prepreg is a carbon fibre/epoxy unidirectional tape that is 0.016 cm thick and has a fibre areal weight of about 145 grams/square meter. The resin content of the tape is 38 wt % with the resin (8552) being a thermoplastic-toughened epoxy. The tape is slit to provide 0.85 cm strips and chopped to provide chips that are 5 cm long. The chip density is about 1.52 gram/cubic centimetre. Other exemplary quasi-isotropic chopped prepreg can be made using other HexPly® unidirectional prepreg tape, such as EMC 116/AS4 (epoxy/carbon fibre), 8552/IM7 (thermoplastic-toughened epoxy/carbon fibre), 3501-6/T650 (epoxy/carbon fibre) and M21/IM7 (thermoplastic-toughened epoxy/carbon fibre). HexMC® 8552/AS4 and M21/TM7 are preferred quasi-isotropic chopped prepregs for use alone, or in combination with other fibre orientations, to form the pre-forms used in the present invention. Other combinations of resins and fiber elements in the form of HexMC® may comprise resin matrices such as BMIs (bismaleimide resins), M65-2 and M77 as supplied by Hexcel Corporation.

Woven fibre fabric and other fibre orientations may be used in combination with the randomly oriented UD prepreg chips to make the preform used in this invention. However, it is preferred that unidirectional fibres are used. The UD fibres may contain from a few hundred filaments to 12,000 or more filaments, UD fibres are typically supplied as a tape made up of continuous fibre in a unidirectional orientation, UD tape is the preferred type of prepreg that is used to form the fibrous structure. Unidirectional tape is available from commercial sources or it may be fabricated using known prepreg formation processes. The dimensions of the UD tape may be varied widely depending upon the particular article being made. For example, the width of the UD tape (the dimension perpendicular to the UD fibres) may range from 0.5 inch to a foot or more. The tape will typically be from 0.004 to 0.012 inch (0.01 to 0.03 cm) thick and the length of the UD tape (the dimension parallel to the U D fibres) may vary from 0.5 inch (1.3 cm) up to a few feet (one meter) or more depending upon the size and shape of the pre-form and the particular orientation of each piece of UD tape within the pre-form.

A preferred exemplary commercially available unidirectional prepreg is HexPly® 8552, which is available from Hexcel Corporation (Dublin, Calif.). HexPly® 8552 is available in a variety of unidirectional tape configurations that contain an amine cured toughened epoxy resin matrix in amounts ranging from 34 to 38 wt % and carbon or glass UD fibres having from 3,000 to 12,000 filaments. The fibres typically account for 60 volume percent of the UD tape. The preferred UD fibres are carbon fibres.

Alternatively the fibrous material in a matrix of curable resin that is moulded according to this invention may be a prepreg or a semipreg of a stack of layers of prepregs and semipregs.

The term prepreg or semipreg is used herein to describe a moulding material or structure in which the fibrous material has been impregnated with a liquid resin to the desired degree and the liquid resin is substantially uncured or partially cured.

The degree of impregnation of the resin in a prepreg can be measured by the water pick up test. The water pick up test is conducted as follows. Six strips of prepreg are cut of size 100 (+/−1-2) mm×100 (+/−1-2) mm. Any backing sheet material is removed. The samples are weighed to the nearest 0.001 g (W1). The strips are then located between PTFE backed aluminium plates so that 15 mm of the prepreg strip protrudes from the assembly of PTFE backed plates on one end and the fibre orientation of the prepreg extends along the protruding part of the strip. A clamp is placed on the opposite end of the strip and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again (W2). The percentage of water uptake WPU (%) is then calculated by averaging the measured weights for the six samples as follows: WPU (%)=[(<W2>−<W1>)/<W1>)×100. The WPU (%) is indicative of the Degree of Resin Impregnation (DRI).

The prepreg or semipreg used in this invention may have a resin impregnation concentration ranging from 20 to 50% by weight, preferably from 30 to 40% by weight and more preferably from 32 to 38% by weight of the material or structure.

In addition to the water pick up the materials moulded according to this invention may be characterized by their overall resin content and/or its fibre volume. Resin and fibre content of the materials are determined in accordance with ISO 1 1667 (method A) for moulding materials or structures which contain fibrous material which does not comprise unidirectional carbon. Resin and fibre content of materials which contain unidirectional carbon fibrous material are determined in accordance with DIN EN 2559 A (code A). Resin and fibre content of moulding materials which contain carbon fibrous material are determined in accordance with DI N EN 2564 A.

The fibre and resin volume % of a moulding material can be determined from the weight % of fibre and resin by dividing the weight % by the respective density of the resin and fibre.

Typically, the values for the resin content by weight for the uncured material that can be moulded according to this invention are in the ranges of from 15 to 70% by weight of the composite, from 18 to 68% by weight of the composite, from 20 to 65% by weight of the composite, from 25 to 60% by weight of the composite, from 25 to 55% by weight of the composite, from 25 to 50% by weight of the composite, from 25 to 45% by weight of the composite, from 25 to 40% by weight of the composite, from 25 to 35% by weight of the composite, from 25 to 30% by weight of the composite, from 30 to 55% by weight of the composite, from 35 to 50% by weight of the composite and/or combinations of the aforesaid ranges.

Typically, the values for the resin content by volume for the material that can be moulded according to this invention are in the ranges of from 15 to 70% by volume of the composite, from 18 to 68% by volume of the composite, from 20 to 65% by volume of the composite, from 25 to 60% by volume of the composite, from 25 to 55% by volume of the composite, from 25 to 50% by volume of the composite, from 25 to 45% by volume of the composite, from 25 to 40% by volume of the composite, from 25 to 35% by volume of the composite, from 25 to 30% by volume of the composite, from 30 to 55% by volume of the composite, from 35 to 50% by volume of the composite and/or combinations of the aforesaid ranges.

Where tows are employed as the fibrous material in the prepregs that are moulded according to the present invention they may be made up of a plurality of individual filaments. There may be many thousands of individual filaments in a single tow. The tow and the filaments within the tow are generally unidirectional with the individual filaments aligned substantially parallel. In a preferred embodiment the tows within the moulding material or structure of the invention are substantially parallel to each other and extend along the direction of travel employed for the processing of the structure. Typically the number of filaments in a tow can range from 2,500 to 10,000 to 50,000 or greater. Tows of about 25,000 carbon filaments are available from Toray and tows of about 50,000 carbon filaments are available from Zoltek. Alternative carbon fiber may comprise Grafil™ as supplied by Mitsubishi.

The materials that are moulded according to this invention may comprise several layers of prepreg or semipreg, sometimes as many as 60 layers typically 2 to 8 layers. Using a veil within the layers in which the interior of the tows is at least partially resin free provides an air venting path or structure, so that air that may be present in the tows of the prepreg is not trapped within the structure by the resin and can escape during the moulding process of this invention. The air is able to escape along the length of the tows. Furthermore, the provision of the spaces between the filaments of the tows will allow air trapped during stack formation to escape during moulding.

The resins used in the resin impregnated fibrous material that are moulded according to this invention are any curable resin. Examples of resins are epoxy resin, polyester resins and bismaleimide resins. Preferred resins are normally available epoxy resins which may contain a hardener and optionally an accelerator. Dicyandiamide is a typical hardener which may be used together with an urea based accelerator. The relative amount of the curing agent and the epoxy resin that should be used will depend upon the reactivity of the resin and the nature and quantity of the fibrous reinforcement in the material. Typically from 0.5 to 10 wt % of the urea based or urea derived curing agent based on the weight of epoxy resin is used.

The prepregs that may be used in this invention may be produced by impregnating the fibrous material with the resin. The viscosity of the resin and the conditions employed for impregnation are selected to enable the desired degree of impregnation. It is preferred that during impregnation the resin has a viscosity of from 0.1 Pa·s to 100 Pa·s, preferably from 6 to 100 Pa·s, more preferably from 18 to 80 Pa·s and even more preferably from 20 to 50 Pa·s. In order to increase the rate of impregnation, the process may be carried out at an elevated temperature so that the viscosity of the resin in reduced. However it must not be so hot for a sufficient length of time that premature curing of the resin occurs. Thus, the impregnation process is preferably carried out at temperatures in the range of from 40° C. to 110° C. more preferably 60° C. to 80° C. It is preferred that the resin content of the prepregs is such that after curing the structure contains from 30 to 40 wt %, preferably 31 to 37 wt % more preferably 32 to 35 wt % of the resin. The relative amount of resin and fibrous reinforcement, the impregnation line speed the viscosity of the resin and the density of the fibrous reinforcement should be correlated to achieve the desired degree of impregnation of the fibrous material and to leave spaces between the individual filaments which are unoccupied by the resin. Alternatively, the resin may be supplied as a solid in powder form.

The resins used in all the moulding materials used in this invention such as the moulding compounds, the prepregs or semipreg, are preferably epoxy resins and they preferably have an Epoxy Equivalent Weight (EEW) in the range from 150 to 1500 preferably a high reactivity such as an EEW in the range of from 200 to 500 and the resin composition comprises the resin and an accelerator or curing agent. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The epoxy resin compositions used preferably also comprises one or more urea based curing agents and it is preferred to use from 0.5 to 10 wt % based on the weight of the epoxy resin of a curing agent, more preferably 1 to 8 wt %, more preferably 2 to 8 wt %. Preferred urea based materials are the range of materials available under the commercial name Urone®. In addition to a curing agent, a suitable accelerator such as a latent amine-based curing agent, such as dicyanopolyamide (DICY).

Preferably, the resin material has a storage modulus G' of from $1 \times 10^6$ Pa to $1 \times 10^7$ Pa, more preferably from $2 \times 10^6$ Pa to $4 \times 10^6$ Pa.

Preferably, the resin material has a loss modulus G" of from $5 \times 10^6$ Pa to $1 \times 10^7$ Pa, more preferably from $7 \times 10^6$ Pa to $9 \times 10^6$ Pa.

Preferably, the resin material has a complex viscosity of from $5 \times 10^5$ Pa·s to $1 \times 10^7$ Pa·s, more preferably from $7.5 \times 10^5$ Pa·s to $5 \times 10^6$ Pa·s, more preferably from $1 \times 10^6$ Pa·s to $2 \times 10^6$ Pa·s.

Preferably, the resin material has a viscosity of from 5 to 30 Pa·s, more preferably 10 to 25 Pa·s, at 80° C. Preferably, the resin material is an epoxy resin.

Furthermore, as stated above the viscosity of the resin in the moulding material particularly in the surface finishing layer is relatively high. This provides that prior to the curing stage, which is typically carried out an elevated temperature, for example at a temperature greater than 75° C., a typical curing temperature being 80° C. or higher, the resin exhibits low or even negligible flow properties, which enhances the surface finish of the moulding. The resin material in the surface finishing layer preferably has a viscosity of from 5 to 30 Pa·s at 80° C., more preferably from 10 to 25 Pa·s at 80° C. V In this specification, the resin flow viscosity during the cure cycle was measured using a TA Instruments AR2000 rheometer with disposable 25 mm diameter aluminium plates. The measurement was carried out with the following settings: increasing temperature from 30 to 130° C. 2° C./mm with a shear stress of 3.259 Pa, gap: 1000 micrometer.

The fibrous material used in the materials that are moulded according to this invention may be multifilament tows which may comprise cracked (i.e. stretch-broken), selectively discontinuous or continuous filaments. The filaments may be made from a wide variety of materials, such as carbon, basaltic fibre, graphite, glass, metalized polymers, aramid and mixtures thereof. Glass and carbon fibres tows are preferred carbon fibre tows, being preferred for aerospace components and wind turbine shells of length above 40 metres such as from 50 to 60 metres. The structural fibres are individual tows made up of a multiplicity of unidirectional individual fibres. Typically the fibres will have a circular or almost circular cross-section with a diameter for carbon in the range of from 3 to 20μη, preferably from 5 to 12μηι. For other fibres, including glass, the diameter may be in the range of from 3 to 600μηι, preferably from 10 to 100μηι. Different tows may be used in different layers of the material that are moulded according to this invention and different composites may be used together according to the properties required of the final cured article.

Exemplary fibres include glass, carbon, graphite, boron, ceramic and aramid. Preferred fibres are carbon and glass fibres. Hybrid or mixed fibre systems may also be envisaged. The use of cracked (i.e. stretch-broken) or selectively discontinuous fibres may be advantageous to facilitate lay-up of the product according to the invention and improve its capability of being shaped. Although a unidirectional fiber alignment is preferable, other forms may also be used. Typical textile forms include simple textile fabrics, knit fabrics, twill fabrics and satin weaves and non-crimp fabrics. It is also possible to envisage using non-woven or non-crimped fiber layers. The surface mass of fibres within the fibrous reinforcement is generally 80-4000 g/m², preferably 100-2500 g/m2², and especially preferably 150-2000 g/m². The number of carbon filaments per tow can vary from 3000 to 320,000, again preferably from 6,000 to 160,000 and most preferably from 12,000 to 48,000. For fiberglass reinforcements, fibres of 600-2400 tex are particularly adapted.

Exemplary layers of unidirectional fibrous tows are made from HexTow® carbon fibres and/or AS4, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used such as those containing about 25,000 filaments available from Toray and those containing about 50,000 filaments available from Zoltek. The tows typically have a width of from 3 to 7 mm and are fed for impregnation on equipment employing combs to hold the tows and keep them parallel and unidirectional.

The tows of the prepregs layers will be impregnated with the resin so that the resin is present between the tows. The impregnation may be controlled so that a first side of the layer of tows is wetted by the resin whereas the second side remains dry. Alternatively both sides can be wetted by resin providing the resin does not fill all the spaces between the individual filaments within the tows. It is preferred that the prepregs used in the present invention are predominantly composed of resin and the multifilament tows.

Epoxy resins can become brittle upon curing and toughening materials can be included with the resin to impart durability. Where the additional toughening material is a polymer it should be insoluble in the matrix epoxy resin at room temperature and at the elevated temperatures at which the resin is cured. Depending upon the melting point of the thermoplastic polymer, it may melt or soften to varying degrees during curing of the resin at elevated temperatures and re-solidify as the cured laminate is cooled. Suitable thermoplastics should not dissolve in the resin, and include thermoplastics, such as polyamides (PAS), polyethersulfone (PES) and polyetherimide (PEI). Polyamides such as nylon 6 (PA6) and nylon 12 (PA12) and mixtures thereof are preferred.

This invention is applicable to the production of a variety of hollow components. It is however particularly useful in the production of aircraft engine components such as thrust reversers where high temperature resistance is required and in this instance bismaleimide resins such as those supplied by Evonik are preferred. The invention is also useful with materials requiring high pressure moulding such as moulding at from 10 to 120 bar, preferably from 40 to 120 bar and at temperatures of from 160° C. to 250° C., preferably from 160° C. to 200° C.

The invention is illustrated by reference to the accompany drawings in which

Figure 1:
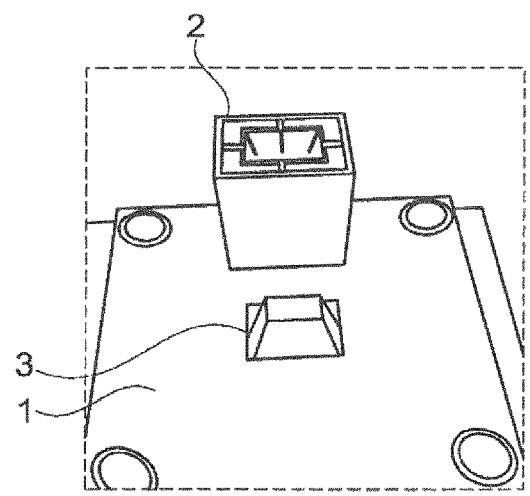
FIG. 1 shows a rectangular mould according to this invention.

FIG. 1 shows a part of a prototype mould comprising a base plate (1), an insert (2) and a central punch (3) provided in the base plate, the top plate is not shown. Also the expandable elastomeric surround or membrane or cover which envelopes the insert is not shown in the drawings. This surround conforms to the surface of the expandable insert to ensure a smooth surface and good release properties on the inside of the moulded article.

Figure 2:
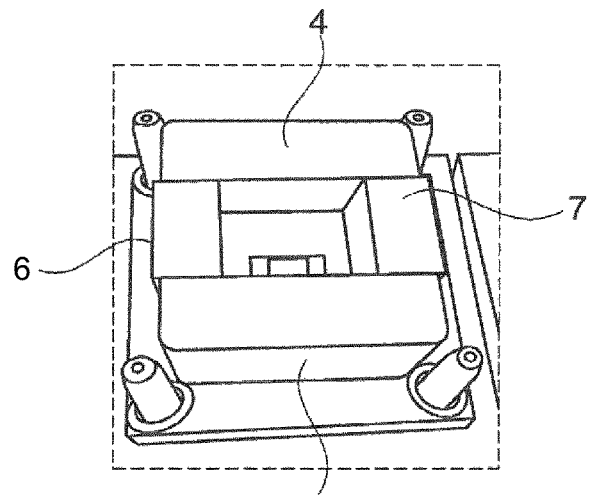
FIG. 2 shows the side walls of the mould of FIG. 1.
Figure 3:
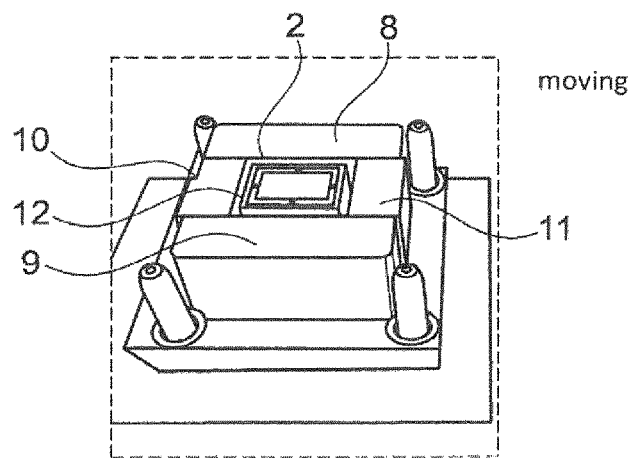
FIG. 3 shows the mould of FIG. 2 containing a fibrous material in a resin matrix being moulded according to the present invention.

FIG. 2 shows the independently movable side walls (4), (5), (6) and (7) provided on the mould part shown in FIG. 1 and FIG. 3 shows the completed mould apart from the top plate containing the insert, the fibrous material in the matrix of curable section (8).

FIG. 3 shows how the system would have been if the top plate was present after insertion of the fibrous material and the insert. The top plate would have been locked at a certain distance from the base so that the moulding material was forced into the corners as the side walls moved to their moulding positions (9), (10), (11) and (12) as is shown in FIG. 3.

In use, a layer of fibrous material embedded in a matrix of thermocurable resin is located between the insert and the outer walls of the cavity, the top is placed onto the cavity and the sections of the insert walls are moved independently to compress the layer of fibrous material between each sectional side wall of the insert and the outer walls of the cavity and the insert and the assembly is heated to cure the thermocurable resin while compressed between the walls of the cavity and the insert.

The mould shown in FIGS. 1 to 3 includes top plate, top lid and a punch. The top plate and top lid are linked with a spring system. In sequence, the top lid shuts onto the movable side walls creating a locked compression chamber. The spring system maintains pressure onto the lid while the punch moves down until it reaches the insert side walls. The tapering of the side walls cause the insert side walls to move simultaneously inwards to apply pressure onto the fibrous material.

Figure 4:
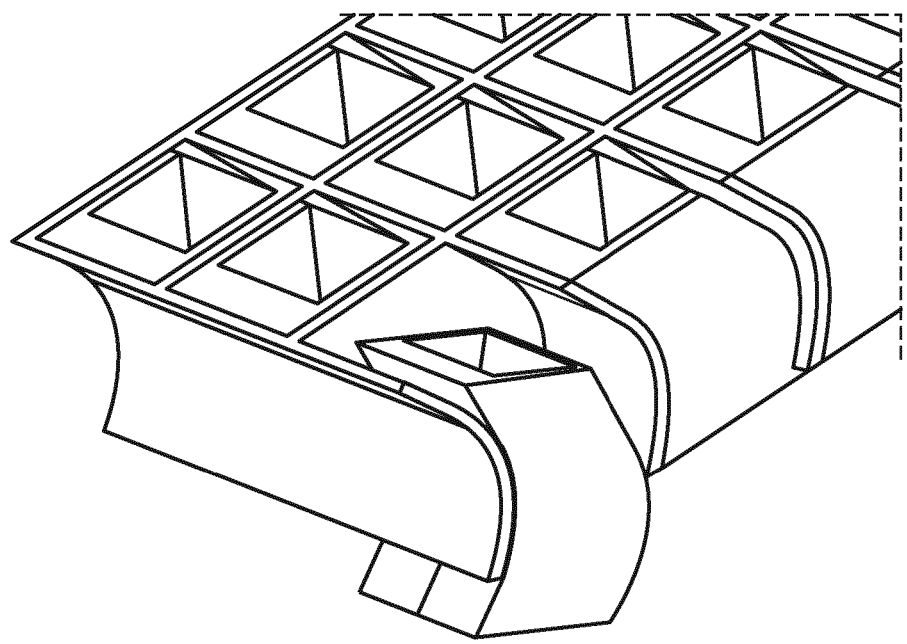
FIG. 4 shows a mould for producing thrust reverser elements by means of an embodiment of the process of the invention.

FIG. 4 shows the manufacture of multiple inserts which can be used in cascade thrust reversers. The light coloured part is an additional forming part which does not form part of the inserts.

Similar to the sequence as shown in FIG. 2, mold moving side walls (4, 5, 6 and 7) are moved in the final position and subsequently, the insert side wall is moved to their molding positions. This applies pressure to the surrounding material so that the stretchable membrane forms the interface between insert side walls and the material.

The invention claimed is:

1. A process for moulding and curing of a fibrous material embedded in a matrix of a thermocurable resin comprising locating an insert within a mould cavity which comprises a top, a base and cavity side walls,
- said insert comprising sectional walls that can move independently of each other to change the shape of the insert,
- providing a layer of fibrous material embedded in a matrix of thermocurable resin between the insert and the cavity side walls,
- placing the top onto the cavity and enlarging the insert to compress the layer of fibrous material between the insert and the cavity side walls
- and heating to cure the thermocurable resin;
- wherein at least two of the sectional walls of the insert are inclined to each other to engage with a punch at an angle of from 20 to 40 degrees;
- wherein the fibrous material embedded in a matrix of thermocurable resin comprises a layer of randomly oriented segments of unidirectional tape impregnated with resin, said segments being arranging in a quasi-isotropic fashion;
- and wherein said quasi-isotropic segments of unidirectional tape are at least partially derived from recycled materials.

2. The process according to claim 1 in which the fibrous material is processed into a preform before introduction into the mould.

* * * * *